US010491827B2

United States Patent
Saito et al.

(10) Patent No.: US 10,491,827 B2
(45) Date of Patent: Nov. 26, 2019

(54) ACTUATOR DRIVER, IMAGING DEVICE AND CALIBRATION METHOD

(71) Applicant: ROHM CO., LTD., Ukyo-ku, Kyoto (JP)

(72) Inventors: Akihito Saito, Ukyo-ku Kyoto (JP); Hiromichi Tanimukai, Ukyo-ku Kyoto (JP); Jun Maede, Ukyo-ku Kyoto (JP); Yoshihiro Sekimoto, Ukyo-ku Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/902,506

(22) Filed: Feb. 22, 2018

(65) Prior Publication Data

US 2018/0249082 A1     Aug. 30, 2018

(30) Foreign Application Priority Data

Feb. 24, 2017    (JP) ................................ 2017-034021

(51) Int. Cl.
*H04N 5/232*      (2006.01)
*G02B 27/64*      (2006.01)
(Continued)

(52) U.S. Cl.
CPC ..... *H04N 5/23287* (2013.01); *G02B 27/1066* (2013.01); *G02B 27/646* (2013.01);
(Continued)

(58) Field of Classification Search
None
See application file for complete search history.

(56) References Cited

U.S. PATENT DOCUMENTS

2006/0285840 A1* 12/2006 Takahashi ............ G02B 27/646
                                                       396/55
2007/0279765 A1* 12/2007 Takahashi ............ G02B 27/646
                                                       359/697

(Continued)

FOREIGN PATENT DOCUMENTS

| JP | H07287268 A | 10/1995 |
|---|---|---|
| JP | 2004080457 A | 3/2004 |

(Continued)

OTHER PUBLICATIONS

KIPO Notification of Reasons for Refusal corresponding to Application No. 10-2018-0019726; dated Mar. 18, 2019.

*Primary Examiner* — Cynthia Segura
(74) *Attorney, Agent, or Firm* — Cantor Colburn LLP

(57) ABSTRACT

An imaging device includes: an imaging element; a lens disposed on a path of incident light to the imaging element; an actuator configured to displace the lens in a plane perpendicular to an optical axis; a position detecting element configured to generate a position detection signal indicating a displacement of the lens; and an actuator driver configured to feedback-control the actuator based on the position detection signal and a target code indicating a target displacement of the lens. The actuator driver includes: a correction circuit that converts a first detection code corresponding to the position detection signal into a second detection code having a linear relationship with an actual displacement of the lens; and a control circuit that controls the actuator so that the second detection code approaches the target code.

10 Claims, 16 Drawing Sheets

(51) Int. Cl.
*H04N 5/341* (2011.01)
*G02B 27/10* (2006.01)
*H04N 17/00* (2006.01)

(52) U.S. Cl.
CPC ......... *H04N 5/23258* (2013.01); *H04N 5/341* (2013.01); *H04N 17/002* (2013.01); *G03B 2205/0038* (2013.01)

(56) References Cited

U.S. PATENT DOCUMENTS

| | | | | |
|---|---|---|---|---|
| 2009/0003813 A1* | 1/2009 | Ohishi | ............... | H04N 5/23248 396/55 |
| 2009/0034950 A1* | 2/2009 | Takagi | ................... | G03B 17/00 396/55 |
| 2009/0315808 A1* | 12/2009 | Ishii | ...................... | G02B 7/102 345/1.3 |
| 2013/0163085 A1* | 6/2013 | Lim | ................... | H02K 41/0356 359/557 |
| 2016/0301858 A1* | 10/2016 | Aoyama | ............ | H04N 5/23222 |
| 2016/0327806 A1* | 11/2016 | Kasamatsu | .......... | G02B 27/646 |
| 2018/0295286 A1* | 10/2018 | Maede | ................ | G02B 27/646 |
| 2018/0343393 A1* | 11/2018 | Maede | ................ | H04N 5/23287 |
| 2018/0376068 A1* | 12/2018 | Shimatani | ............ | H04N 5/2257 |

FOREIGN PATENT DOCUMENTS

| | | |
|---|---|---|
| JP | 2009145635 A | 7/2009 |
| JP | 2010204575 A | 9/2010 |
| WO | 2015087533 A1 | 3/2017 |

* cited by examiner

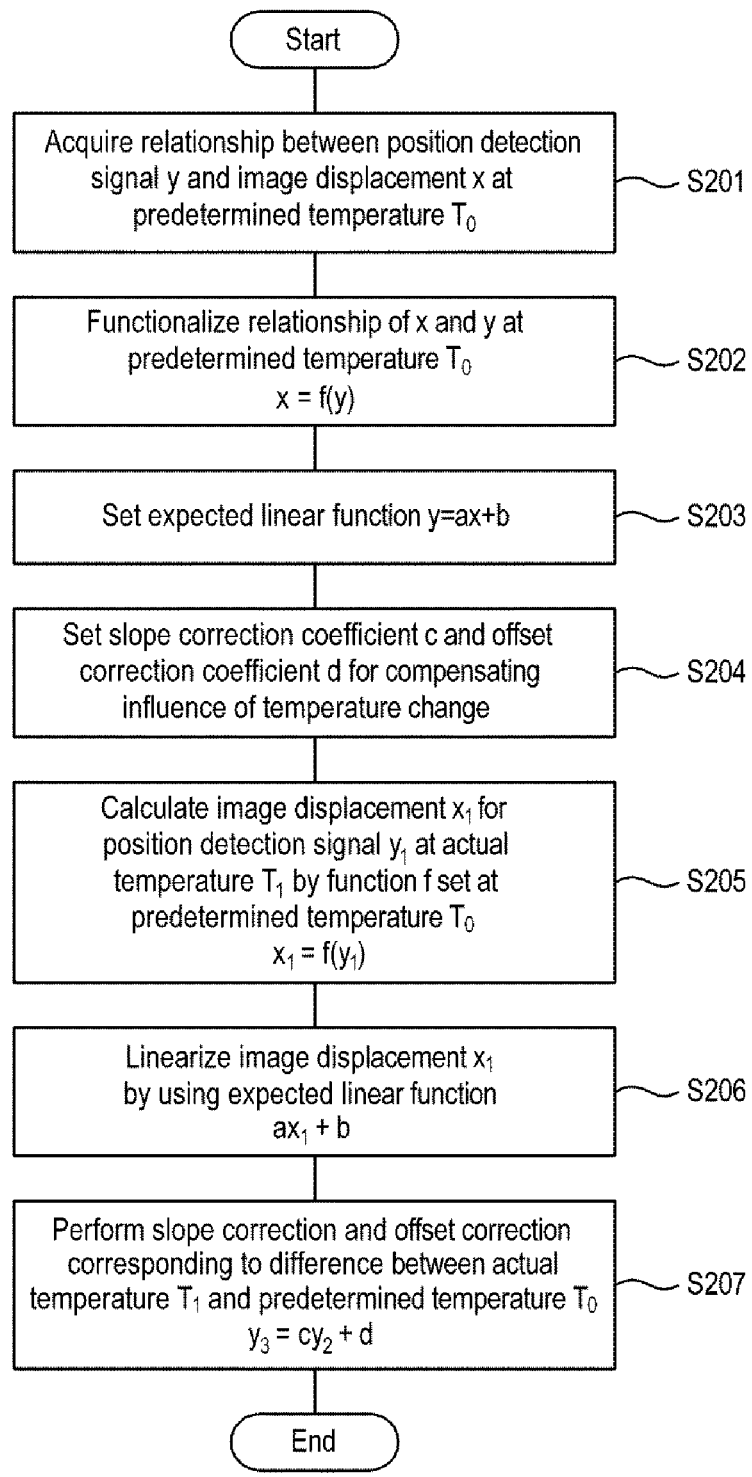

ACTUATOR DRIVER, IMAGING DEVICE AND CALIBRATION METHOD

CROSS-REFERENCE TO RELATED APPLICATION

This application is based upon and claims the benefit of priority from Japanese Patent Application No. 2017-034021, filed on Feb. 24, 2017, the entire contents of which are incorporated herein by reference.

TECHNICAL FIELD

The present disclosure relates to an imaging device.

BACKGROUND

In recent years, optical camera shake correction (which may be also referred to as an optical image stabilizer (OIS)) has been adopted for a camera module incorporated in a smartphone or the like. A camera module with OIS includes a lens (also referred to as a camera shake correction lens) movable in a direction (XY plane) horizontal to an imaging surface of an imaging element. When blurriness is detected by a blur detecting part such as a gyro sensor, the lens is shifted so that the blurriness is canceled out.

FIG. 1 is a block diagram of a camera module with a camera shake correction function. A camera module 1000 includes an imaging element 1002, a lens 1004, an actuator 1006, an actuator driver 1008, a position detecting element 1010, a blur detecting part 1012, and a CPU (Central Processing Unit) 1014.

The imaging element 1002 picks up an image transmitted through the lens 1004. The blur detecting part 1012 detects blurriness in an output from the camera module 1000. The actuator driver 1008 receives a signal $D_1$ indicating the amount of blur detected by the blur detecting part 1012 and generates a target code indicating a target value of displacement of the lens 1004 so as to cancel out the blur. The actuator driver 1008 generates a drive signal $S_5$ for the actuator 1006 based on the internally generated target code. The actuator 1006 positions the lens 1004 according to the drive signal S5.

Feedback control (closed-loop control) is adopted for the camera shake correction because it is necessary to accurately position the lens 1004. The position detecting element 1010 generates a position detection signal $S_2$ indicating the displacement of the lens 1004. The actuator driver 1008 performs feedback control of the drive signal $S_5$ so that the position of the lens 1004 indicated by the position detection signal $S_2$ coincides with the target position indicated by the target code.

The actuator driver 1008 performs linear control between the angle blur amount calculated based on the output of the blur detecting part 1012 and the displacement of the lens 1004. Therefore, in the camera module 1000, it is important that linearity is secured between the detected displacement of the lens 1004 and the actual displacement. However, since it is difficult to guarantee perfect linearity between the position detection signal $S_2$ generated by the position detecting element 1010 and the actual displacement of the lens 1004, correction is necessary.

In this connection, a technique is being developed using a correction function or a correction table to correct the nonlinearity of an output of a position detecting element in OIS. Other techniques are also being developed to compensate for a fluctuation in output of an OIS position detecting element caused by a change in temperature.

For such correction (hereinafter referred to as linear compensation), it is necessary to measure the relationship between the position detection signal $S_2$ and the actual position of the lens 1004 in advance.

The displacement information of the lens 1004 in the direction of an optical axis (Z axis) can be measured by using a relatively inexpensive laser displacement gauge or the like, which may be, in many cases, installed in a manufacturing process.

In order to acquire displacement information in a direction (XY axis) perpendicular to the optical axis, which is necessary for control of optical camera shake correction by the laser displacement gauge, the lens 1004 must be irradiated with a laser from the direction perpendicular to the optical axis. In practice, however, since the side surface of the lens 1004 is covered with other members (not shown), it is difficult to measure the displacement of the lens 1004 with the laser displacement gauge.

There is also a displacement gauge that detects the displacement in the XY direction from the Z axis direction, but since it is necessary to install a dedicated target, it takes much time and labor for measurement. In addition, since this displacement gauge is expensive, the cost to obtain displacement information becomes high. A laser Doppler measuring instrument may also be used to measure the displacement in the XY direction, but it is similarly expensive.

SUMMARY

Some embodiments of the present disclosure provide a technique for acquiring data required for linear compensation without using a laser displacement gauge or a laser Doppler measuring instrument.

According to one embodiment of the present disclosure, an imaging device includes: an imaging element; a lens disposed on a path of incident light to the imaging element; an actuator configured to displace the lens in a plane perpendicular to an optical axis; a position detecting element configured to generate a position detection signal indicating a displacement of the lens; and an actuator driver configured to feedback-control the actuator based on the position detection signal and a target code indicating a target displacement of the lens. The actuator driver includes: a correction circuit that converts a first detection code corresponding to the position detection signal into a second detection code having a linear relationship with an actual displacement of the lens; and a control circuit that controls the actuator so that the second detection code approaches the target code. In a calibrating process of acquiring a relational expression for converting the first detection code into the second detection code, the actual displacement of the lens is based on a moving distance of an image captured by the imaging element.

According to this embodiment, the actual displacement of the lens can he measured without using a laser displacement gauge or a laser Doppler measuring instrument, and information obtained from the measurement can be used to obtain data required for linear compensation.

The moving distance of the image may be calculated from the number of pixels, by which the image moves, and a pixel pitch of the imaging element.

According to another embodiment of the present disclosure, a method of calibrating an imaging device includes: an imaging element; a lens disposed on a path of incident light to the imaging element; an actuator configured to displace the lens in a plane perpendicular to an optical axis; a position detecting element configured to generate a position detection signal indicating a displacement of the lens; and an actuator driver configured to feedback-control the actuator based on the position detection signal and a target code indicating a target displacement of the lens. The actuator driver includes: a correction circuit that converts a first detection code corresponding to the position detection signal into a second detection code having a linear relationship with an actual displacement of the lens; and a control circuit that controls the actuator so that the second detection code approaches the target code. The method includes: presenting an imaging target as a reference to the imaging device; acquiring, while the actuator driver controls the actuator to displace the lens to a plurality of points, the first detection code and a moving distance of an image captured by the imaging element at each of the plurality of points; and generating a relational expression for converting the first detection code into the second detection code based on the first detection code and the moving distance of the image obtained at each point of the plurality of points.

According to another embodiment of the present disclosure, an actuator driver for use in an imaging device includes: an imaging element; a lens disposed on a path of incident light to the imaging element; an actuator configured to displace the lens in a plane perpendicular to an optical axis; a position detecting element configured to generate a position detection signal indicating a displacement of the lens; and an actuator driver configured to feedback-control the actuator based on a target code indicating a target displacement of the lens and the position detection signal. The actuator driver includes: a correction circuit configured to convert a first detection code corresponding to the position detection signal into a second detection code having a linear relationship with an actual displacement of the lens; a control circuit configured to control the actuator so that the second detection code approaches the target code; and a processor configured to execute a calibration program to acquire a relational expression for converting the first detection code into the second detection code. The actual displacement of the lens acquired during the execution of the calibration program is based on a moving distance of an image captured by the imaging element.

According to another embodiment of the present disclosure, an imaging device includes an imaging lens, an imaging element, an actuator for driving the imaging lens, a positron detecting part for detecting a position of the imaging lens, and a linear compensating part for correcting linearity of a relationship between a position detection signal from the position detecting part and a displacement of the imaging lens. The displacement of the imaging lens is calculated, as a moving distance of an image at the time of movement of the imaging lens, from image information of the imaging element.

With the above configuration, displacement information of the imaging lens can be obtained without using an expensive displacement measuring instrument, and the linearity of the relationship between the position detection signal and the displacement of the imaging lens can be corrected based on the obtained displacement information. Thus, it is possible to position the imaging lens with high accuracy and at a high speed.

The moving distance of the image may be calculated from the number of pixels, by which the image moves, and a pixel pitch of the imaging element.

With the above configuration, it is possible to calculate the displacement of the imaging lens with simple calculation.

The linear compensating part may determine the relationship between the position detection signal and the displacement of the imaging lens, calculate the displacement of the imaging lens by applying an actually detected position detection signal to the function, and correct the position detection signal so that the calculated displacement of the imaging lens becomes a predetermined straight line.

With the above configuration, since the linearity of the relationship between the position detection signal and the displacement of the imaging lens can be corrected, it is possible to position the imaging lens with high accuracy and at a high speed.

The function may be approximated by linear connection.

With the above configuration, since linearization can be realized by calculation using a first order function without performing a complex function calculation, it is possible to simplify calculation for linearization.

The relationship between the position detection signal and the displacement of the imaging lens may be calculated before factory shipment of the image device and may be recorded in a memory in the imaging device.

With the above configuration, it is possible to correct the linearity of the relationship between the position detection signal and the displacement of the imaging lens based on the relationship between the recorded position detection signal and the displacement of the imaging lens.

The relationship between the position detection signal and the displacement of the imaging lens may be calculated at a predetermined timing.

With the above configuration, for example, it is possible to displace the imaging lens when a camera of a smartphone is activated, measure a displacement of an image of an imaging target, and correct the linearity of the relationship between the position detection signal and the displacement of the imaging lens based on the relationship between the position detection signal and the displacement of the imaging lens at the measurement time. Further, since the relationship between the position detection signal and the displacement of the imaging lens in a state where the camera is actually used can be acquired, it is possible to compensate for temperature change and changes in the environment.

The relationship between the position detection signal and the displacement of the imaging lens may be calculated according to a command from a user.

With the above configuration, for example, it is possible to displace the imaging lens when a user of a smartphone pushes a linear compensation command button, measure a displacement of an image of an imaging target, and correct the linearity of the relationship between the position detection signal and the displacement of the imaging lens based on the relationship between the position detection signal and the displacement of the imaging lens at the measurement time. Further, since the relationship between the position detection signal and the displacement of the imaging lens in a state where the camera is actually used can be acquired, it is possible to compensate tier temperature change and changes in the environment.

The imaging device may include a temperature compensating part in addition to the linear compensating part, to correct a change in the relationship between the position detection signal and the displacement of the imaging lens due to temperature, while correcting the linearity of the relationship between the position detection signal and the displacement of the imaging lens.

With the above configuration, since temperature compensation can be performed in addition to the linear compensation, it is possible to position the imaging lens with higher accuracy and at a higher speed.

The temperature detection of the temperature compensating part may be performed by using a change in an internal resistance of the position detecting part due to temperature.

With the above configuration, since the temperature is detected by using a change in terminal-to-terminal resistance of a Hall element inside the actuator, it is possible to accurately detect an ambient temperature of a temperature-compensation target, thereby facilitating the temperature compensation with high accuracy.

According to another embodiment of the present disclosure, an actuator driver includes a position detector that generates a position detection value indicating a position of a control target, a correcting part that corrects the position detection value, a controller that generates a control command value so that the corrected position detection value becomes equal to a position command value indicating a target position of the control target, and a driver part that applies a drive signal corresponding to the control command value to an actuator. The correcting part uses displacement information obtained from movement information of an image in image information of the imaging element to correct the linearity of the relationship between the position detection value and an actual displacement of the control target.

According to this aspect, the displacement information of the control target can be obtained without using an expensive displacement measuring instrument, and the linearity of the relationship between the position detection signal and the displacement of the control target can be corrected based on the obtained displacement information. Thus, it is possible to position the control target with high accuracy and at a high speed.

The correcting part may determine the relationship between the position detection signal and the actual displacement of the control target, calculate the displacement of the control target using the determined relationship, and correct the position detection signal so that the calculated displacement of the control target becomes a predetermined straight line.

The function may be approximated by linear connection.

The correcting part may correct the linearity of the relationship between the position detection signal and the displacement of the control target and may also correct a change in the relationship between the position detection signal and the displacement of the control target due to temperature.

Any combinations of the above-described elements or changes of the representations of the present disclosure between methods, apparatuses and systems are effective as embodiments of the present disclosure. Furthermore, the description of the parts to solve the above problems does not account for all the essential features and therefore, sub-combinations of these features recited in the present disclosure should be construed to fall within the scope of the present disclosure.

BRIEF DESCRIPTION OF DRAWINGS

FIG. 8 is a flowchart showing a process of linear compensation and temperature compensation in an imaging device according to a first embodiment.

DETAILED DESCRIPTION

Figure 1:
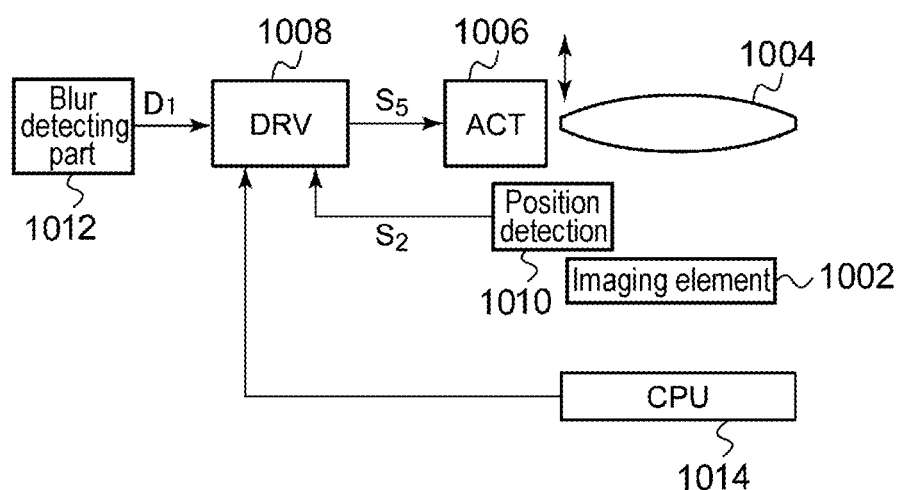
FIG. 1 is a block diagram of a camera module with a camera shake correction function.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

Further, the dimensions (thickness, length, width, etc.) of each member illustrated in the drawings may he scaled appropriately for easy understanding in some cases. Furthermore, the dimensions of a plurality of members do not necessarily represent the magnitude relationship between them. For example, even when a certain member A is drawn thicker than another member B in the drawings, the member A may be thinner than the member B.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 2:
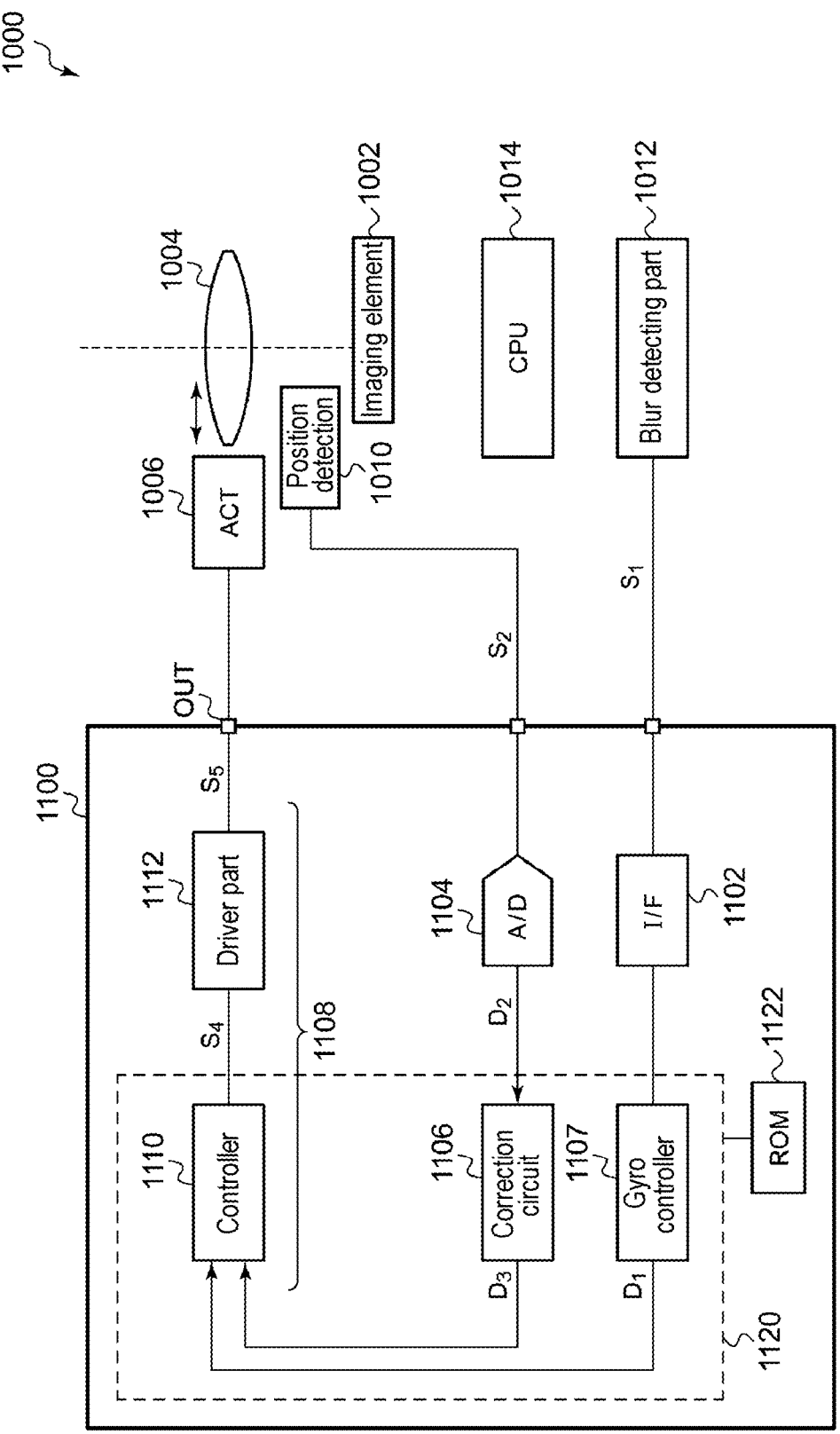
FIG. 2 is a block diagram of a camera module according to an embodiment.

FIG. 2 is a block diagram of a camera module 1000 according to an embodiment. The camera module 1000 in FIG. 2 has the same basic configuration as that in FIG. 1. A lens 1004 is disposed on a path of incident light to an imaging element 1002. An actuator 1006 displaces the lens 1004 within a plane perpendicular to the optical axis (a plane horizontal to an imaging surface of the imaging element 1002). A position detecting element 1010 is a Hall sensor or the like and generates a position detection signal (Hall signal) $S_2$ indicating the displacement of the lens 1004. A blur detecting part 1012 is, for example, a gyro sensor and detects blurriness in an output from the camera module 1000. An actuator driver 1100 generates a target code $D_1$ indicating a target value of the displacement of the lens 1004 so that the blurriness is canceled out. The actuator driver 1100 generates a drive signal $S_5$ for the actuator 1006 based on the target code $D_1$. The lens 1004 is attached to a mover of the actuator 1006 and is moved to a position corresponding to the target code $D_1$. In a typical camera module, the lens 1004 can he displaced by the actuator 1006 in two dimensions in relation to OIS. However, in the following description, for the sake of clarity, it is assumed that the lens 1004 is displaced only in one dimension.

More specifically, the actuator driver 1100 feedback-controls the actuator 1006 based on an angular velocity signal $S_1$ indicating the amount of blur and the position detection signal $S_2$.

The actuator driver 1100 includes an interface circuit 1102, an A/D converter 1104, a correction circuit 1106, a gyro controller 1107, and a control circuit 1108. The interface circuit 1102 receives the digital angular velocity signal $S_1$ corresponding to the amount of blurriness from the blur detecting part 1012. The A/D converter 1104 converts the position detection signal $S_2$ from the position detecting element 1010 into a digital first detection code $D_2$. An amplifier may he installed before the A/D converter 1104. When the position detection signal $S_2$ is a digital signal, the A/D converter 1104 may be omitted.

The correction circuit 1106 converts the first detection code $D_2$ into a second detection code $D_3$ having a linear relationship with the actual displacement of the lens 1004 (linear compensation). The gyro controller 1107 generates the target code $D_1$ based on the angular velocity signal $S_1$.

The control circuit 1108 controls the actuator 1006 so that the second detection code $D_3$ approaches the target code $D_1$. The control circuit 1108 includes a controller 1110 and a driver part 1112. The controller 1110 generates a control command value $S_4$ so that an error between the second detection code $D_3$ and the target code $D_1$ approaches zero. The driver part 1112 outputs the drive signal $S_5$ corresponding to the control command value Si to the actuator 1006.

The above is an overall configuration of the camera module 1000. Subsequently, a correcting process in the correction circuit 1106 will be described.

Figure 3A:
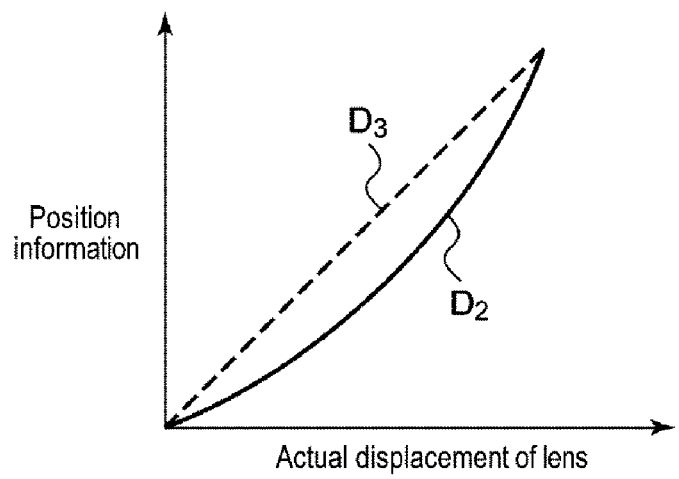
FIG. 3A is a graphical view showing a relationship among a first detection code, an actual displacement of a lens, and a second detection code.
Figure 3B:
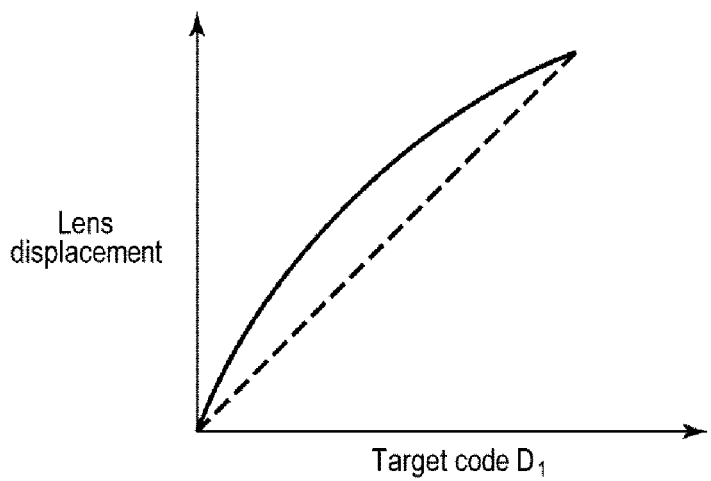
FIG. 3B is a graphical view showing a relationship between a target code and the displacement of the lens.

FIG. 3A is a graphical view showing a relationship among the first detection code $D_2$, the actual displacement of the lens 1004, and the second detection code $D_3$, and FIG. 3B is a, graphical view showing a relationship between the target code $D_1$ and the displacement of the lens 1004.

As indicated by a solid line in FIG. 3A, the relationship between the first detection code $D_2$ and the actual displacement of the lens 1004 is nonlinear in most cases. On the other hand, the gyro controller 1107 carries out the calculation of camera shake correction on the premise that the lens 1004 is linearly displaced with respect to the target code $D_1$. When correction by the correction circuit 1106 is not performed, feedback control is applied so that the first detection code $D_2$ matches the target code $D_1$. As a result, as indicated by a solid line in FIG. 3B, the amount of displacement of the lens 1004 with respect to the target code $D_1$ becomes arcuate, which results in decreased accuracy of camera shake correction.

The second detection code $D_3$ obtained by the correction by the correction circuit 1106 linearly changes with respect to the actual displacement x of the lens 1004, as indicated by a broken line in FIG. 3A. When the feedback control is applied so that the second detection code $D_3$ matches the target code $D_1$, the lens linearly displaces with respect to the target code $D_1$, as indicated by a broken line in FIG. 3B.

The correcting process in the correction circuit 1106 requires a relational expression of $D_3=F(D_2)$ for converting the first detection code $D_2$ in FIG. 3A into the second detection code $D_3$. This relational expression of $D_3=F(D_2)$ is obtained in a calibrating process before product shipment. This calibrating process requires accurate measure of the actual displacement x of the lens 1004.

Figure 4A:
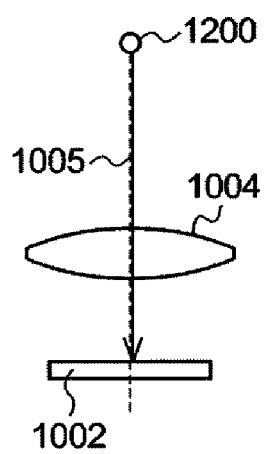
FIG. 4A to FIG. 4C are views for explaining the principle of measuring a displacement of a lens.
Figure 4B:
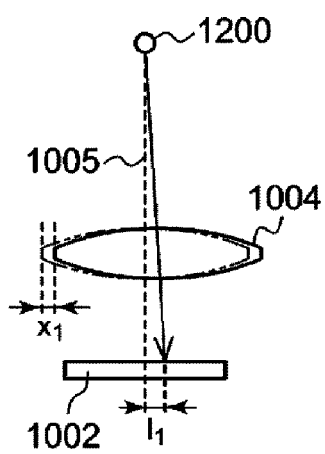
Figure 4C:
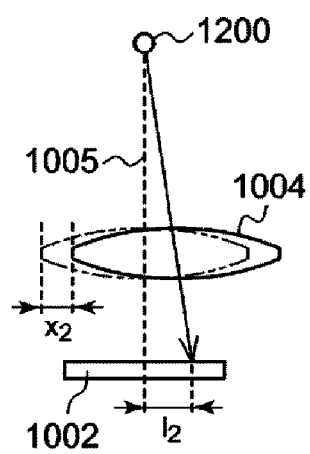

In the calibrating process, the actual displacement of the lens 1004 is acquired based on a moving distance of an image captured by the imaging element 1002. FIG. 4A to FIG. 4C are views for explaining the principle of measuring the displacement of the lens 1004. An object (hereinafter referred to as a standard imaging target) 1200 is placed on an optical axis 1005 of the lens 1004, and the position of the standard imaging target 1200 is fixed. An optical system is adjusted so that the standard imaging target 1200 forms an image on the imaging surface of the imaging element 1002. As shown in FIG. 4A, when the displacement is zero, the standard imaging target 1200 forms an image at the center of the lens 1004. As shown in FIG. 4B and FIG. 4C, when the lens 1004 is displaced to the right, the position at which the standard imaging target 1200 forms an image moves.

Moving distances $l_1$, and $l_2$ of the imaging position (also simply referred to as an image) and displacements $x_1$ and $x_2$ of the lens 1004 are associated in one-to-one correspondence, and their relational expressions can be obtained by calculation from geometrical optics. Alternatively, an optical system having the same configuration as the camera module 1000 (except that it is easy to emit a laser from the side) may he constructed and a laser displacement gauge may be used to measure the relationship between the moving distance l and the displacement x of the lens 1004.

Figure 5:
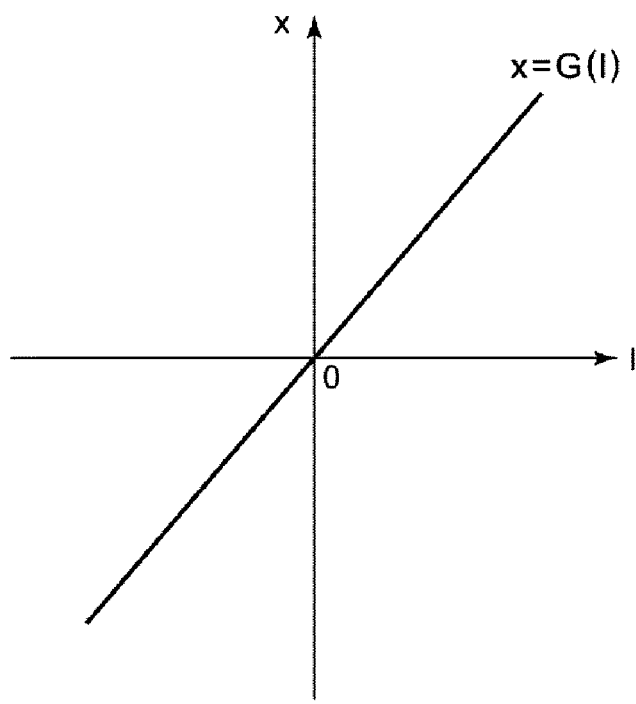
FIG. 5 is a graphical view showing an example of a relationship between a moving distance of an image and a displacement of a lens.

FIG. 5 is a graphical view showing an example of the relationship between the moving distance l of an image and the displacement x of a lens. The moving distance l of the image can be obtained by analyzing image data captured by the imaging element 1002. Specifically, the image moving distance l can be calculated by multiplying the number of pixels, by which the position of the image has moved in the image, by a pixel pitch.

Figure 6:
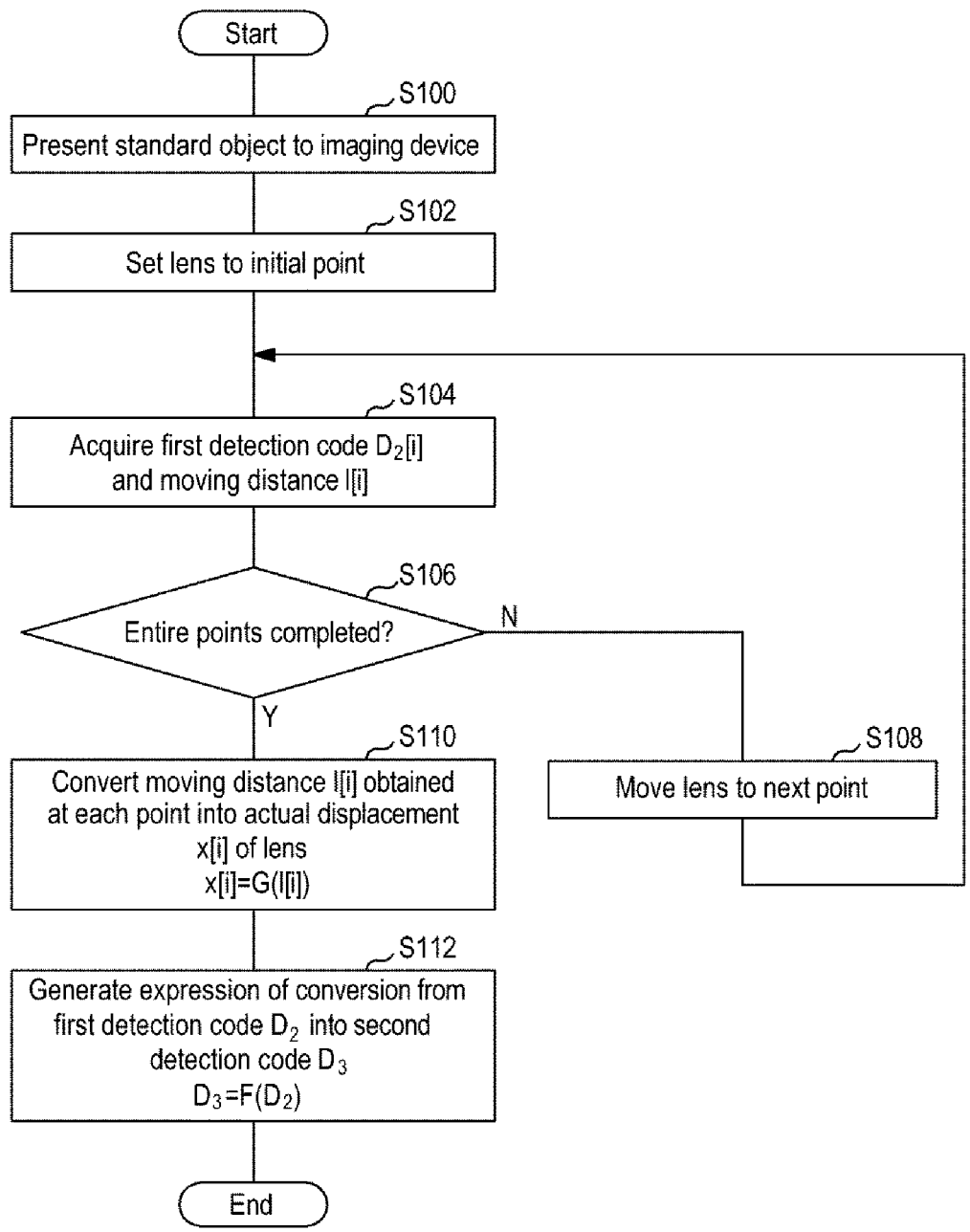
FIG. 6 is a flowchart for calibration of an imaging element.

Since the relational expression of $x=G(l)$ in FIG. 5 is uniquely determined depending on the configuration of the optical system, the actual displacement of the lens 1004 corresponding to the image moving distance l is uniquely determined, FIG. 6 is a flowchart of calibration of the imaging element. First, a reference image (standard imaging target 1200) is presented to the camera module 1000 (S100). Subsequently, the actuator driver 1100 controls the actuator 1006 to displace the lens 1004 to a plurality of points (N points $P_1$ to $P_N$), while acquiring the first detection code $D_2$, and the moving distance l of the image captured by the imaging element 1002, at each of the points (S102 to S108).

Specifically, the lens 1004 is set at the initial point $P_1$ (S102), and the first detection code $D_2$ and the image moving distance l are acquired (S104). With the initial point as the first point, a detection code $D_2[i]$ and a moving distance $l[i]$ at the $i^{th}$ point $P_i$ are acquired. A determination is then made of whether or not processing for all the points $P_1$ to $P_N$ has been completed (S106). If the processing has not been completed (N in S106), the lens 1004 is moved to the next point (S108), and the process returns to the step S104.

If the processing for all the points has been completed (Y in S106), the image moving distances $l[1]$ to $l[N]$ obtained at the respective points are converted into the actual displacements $x[1]$ to $x[N]$ of the lens 1004, For this conversion, the relational expression of $x=G(l)$ shown in FIG. 5 is used (S110). Step S110 is performed each time $D_2[i]$ and $l[i]$ are acquired at the corresponding point $P_i$.

Based on the actual displacements $x[1]$ to $x[N]$ of the lens 1004 and the first detection codes $D_2[1]$ to $D_2[N]$, which are obtained at the respective points, the following relational expression for converting the first detection code $D_2$ into the second detection code $D_3$ is generated.

$$D_3=F(D_2)$$

In most optical systems, it is geometrically-optically guaranteed that the relational expression of $x=G(l)$ in FIG. 5 is linear. In such optical systems, the conversion expression of FIG. 5 is merely a scaling of values, and the image moving distance l can be treated as the actual displacement x of the lens. In this case, the step S110 may be omitted.

The calibrating process is completed as described above. The relational expression of $D_3=F(D_2)$ may be stored in a nonvolatile memory (1122 in FIG. 2) such as a ROM or a FeRAM of the actuator driver 1100. Alternatively, the relational expression of $D_3=F(D_2)$ may be stored in a ROM (not shown in FIG. 2) attached to the CPU 1014 and written in a register (not shown in FIG. 2) of the actuator driver 1100 when activating the actuator driver 1100.

Returning to FIG. 2, the actuator driver 1100 may include a processor core (embedded processor) 1120 capable of executing a program (also referred to as firmware). In this case, the controller 1110 and the correction circuit 1106 are implemented by a combination of the processor core 1120 and the program. A calibration program is stored in the memory 1122 incorporated in (or externally attached to) the actuator driver 1100.

The actuator driver 1100 may be configured to be capable of executing the calibration program, and may be a main part to provide the above-described calibrating process.

The calibration program may provide at least one of the following functions.

(Function 1): A function of automatically displacing the lens 1004 to the plurality of points $P_1$ to $P_N$, by the actuator driver 1100, when a calibration start command is issued to the actuator driver 1100.

That is to say, the calibration program provides a function of automatically generating a target code $D_0$ without respect to the angular velocity signal $S_1$ from the blur detecting part 1012.

(Function 2): A function of automatically generating the conversion expression of $D_3=F(S_2)$ when the image moving distances $l[1]$ to $l[N]$ obtained at the plurality of points $P_1$ to $P_N$ are given.

That is to say, the processor core 1120 acquires the actual displacements $x[1]$ to $x[N]$ of the lens 1004 based on the image moving distances $l[1]$ to $l[N]$.

(Function 2'): A function of automatically generating the conversion expression of $D_3=F(S_2)$ when actual displacements $x[1]$ to $x[N]$ of the lens obtained at the plurality of points $P_1$ to $P_N$ are given.

The above is the configuration of the camera module 1000 and the basic principle of calibration.

When the environmental temperature of the camera module 1000 changes, since the relationship between the actual displacement and the position information in FIG. 3A varies, the above-described calibrating process may be performed in consideration of temperature dependency, as will be described later.

The present disclosure extends to various devices and circuits derived from the above description and is not limited to a specific configuration. In the following, more specific configuration examples and modifications will be described in order to aid understanding of the essence of the present disclosure and circuit operations and to clarify them, rather than to narrow the scope of the present disclosure.

Figure 7:
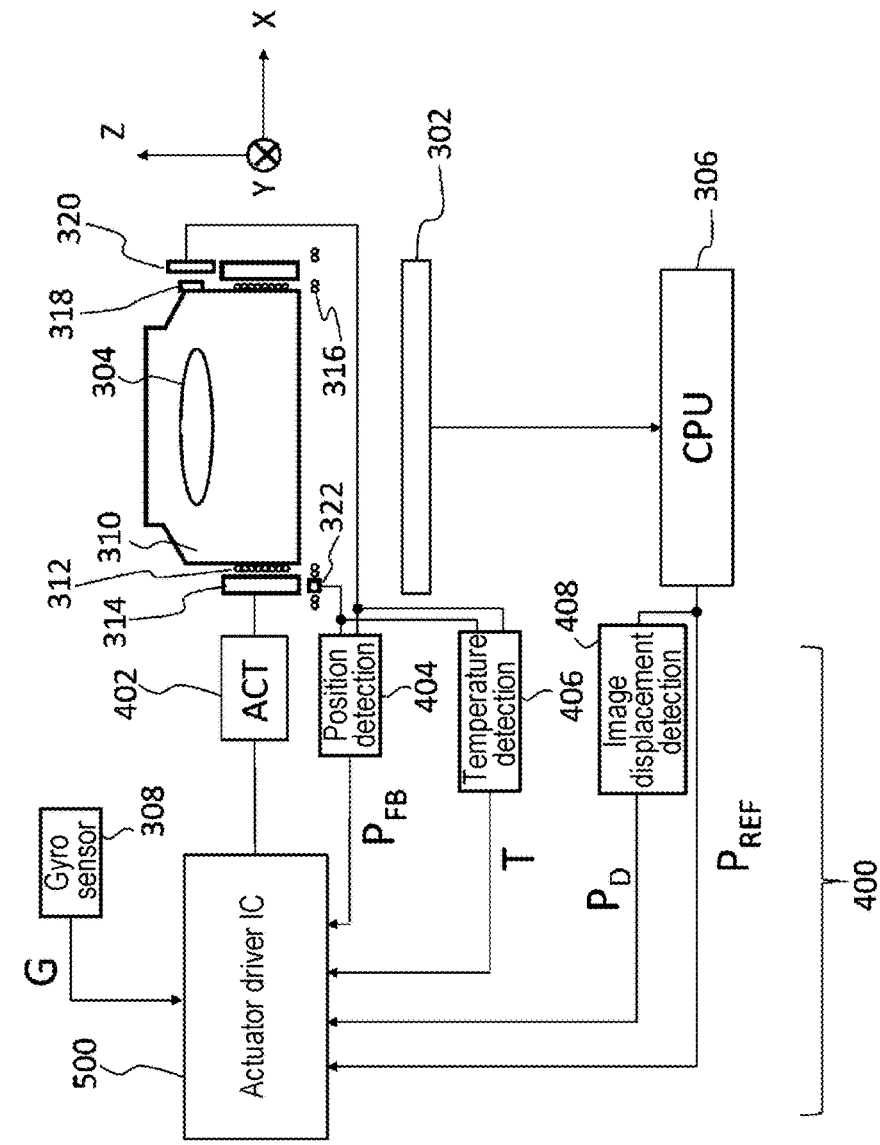
FIG. 7 is a view showing a configuration example of an imaging device.

In the present embodiment, a specific configuration of an imaging device will be first described: FIG. 7 is a view showing an imaging device. An imaging device 300 is a camera module incorporated in a digital camera, a digital video camera, a smartphone or a tablet terminal. The imaging device 300 includes an imaging element 302, a lens 304, a processor 306, and a lens control device 400, The imaging device 300, the imaging element 302, the lens 304, the processor 306, and the lens control device 400 correspond to the camera module 1000, the imaging element 1002, the lens 1004, the CPU 1014, and the actuator driver 1100 and the actuator 1006 of FIG. 2, respectively.

The lens 304 is disposed on the optical axis of light incident onto the imaging element 302. For example, the lens 304 may be an autofocus (AF) lens or an OIS lens. For example, in the case of AF, the lens control device 400 positions the lens 304 based on a position command value $P_{REF}$ from the processor 306. In the case of OIS, the lens control device 400 generates a position command value $P_{REF}$ based on an angular velocity signal from a gyro sensor 308, and positions the lens 304 based on the position command value $P_{REF}$.

For example, when the lens 304 is an AF lens, the lens control device 400 displaces the lens 304 in the optical axis direction (Z axis direction). The processor 306 generates the position command value PREF (contrast AF) so that the contrast of an image captured by the imaging element 302 becomes high. Alternatively, the position command value $P_{REF}$ (phase difference AF) may be generated based on an output from an AF sensor which is installed outside the imaging element 302 or is embedded in an imaging surface of the imaging element 302.

When the lens 304 is used for both AF and OIS, the lens control device 400 displaces the lens 304 in the optical axis direction (Z axis direction) and a direction perpendicular to the optical axis (X axis and/or Y axis direction) in a plane parallel to the imaging element 302. The processor 306 generates the position command value $P_{REF}$ in the same way as described above for AF and based on the output from the gyro sensor 308 for OIS. The gyro sensor 308 corresponds to the blur detecting part 1012 of FIG. 2.

The following description will be given to the lens 304 used as a lens (also referred to as an imaging lens) for both AF and OIS.

The lens control device 400 controls the actuator 402 by position feedback. Specifically, the lens control device 400 includes an actuator 402, a position detecting element (AF/OIS) 404, a temperature detecting element (AF/OIS) 406, and an actuator driver IC (Integrated Circuit) 500. The OIS position detecting element 404 corresponds to the position detecting element 1010 of FIG. 2.

The actuator 402 is, for example, a voice coil motor, and the lens 304 is mounted on a holder 310 and is movably supported in the Z axis direction. An AF coil 312 is wound around the holder 310, and a permanent magnet 314 is disposed so as to face the AF coil 312. When a current flows into the AF coil 312, the lens 304 and the holder 310 are integrally driven in the Z axis direction due to magnetic interaction with the permanent magnet 314. On the other hand, the entire AF driving mechanism including the permanent magnet 314 is movably supported in the X axis direction and/or the Y axis direction. When a current flows into an OIS coil 316 disposed in a fixed part, the lens 304, the holder 310, the permanent magnet 314 and the like are driven in the X axis direction and/or the Y axis direction due to magnetic interaction with the permanent magnet 314. The fixed part of the voice coil motor is fixed to a housing of the imaging device 300.

A magnetic detecting mechanism such as a Hall element is widely used as the position detecting element 404, and the following description will be given on the assumption of a Hall element being used. A permanent magnet 318 is attached to an AF movable part of the voice coil motor, for example, the holder 310, and an AF Hall element 320 is attached to an unmovable part. A combination of the permanent magnet 318 and the AF Hall element 320 forms the AF position detecting element 404. On the other hand, an OIS Hall element 322 is attached to the fixed part so as to face the permanent magnet 314. A combination of the permanent magnet 314 and the OIS Hall element 322 forms the OIS position detecting element 404. Although the Hall element 322 is shown only for the X axis in FIG. 7, there is also a Hall element for the Y axis at a position obscured by a shadow in FIG. 7. The position detecting element 404 generates an electric signal (hereinafter referred to as a position detection signal $P_{FB}$) according to the current position of the lens 304, which is fed back to the actuator driver IC 500. The position detection signal $P_{FB}$ corresponds to the position detection signal $S_2$ in FIG. 2.

The actuator driver IC 500 is a functional IC integrated on a single semiconductor substrate and corresponds to the actuator driver 1100 of FIG. 2. As used herein, the term "integrated" is intended to include both when all elements of a circuit are formed on a semiconductor substrate and when main elements of the circuit are integrated on the semiconductor substrate. In addition, some resistors, capacitors and the like for adjustment of a circuit constant may be provided outside the semiconductor substrate. By integrating the circuit on one chip, the circuit area can be reduced and the characteristics of the circuit elements can be kept uniform.

The actuator driver IC 500 feedback-controls the actuator 402 so that the fed-back position detection signal $P_{FB}$ matches the position command value $P_{REF}$.

In this manner, by detecting the position of the lens 304 and using the detected position for feedback position control, it is possible to suppress the transient vibration in a step response to accelerate the convergence and enhance the positioning accuracy to a target position.

It is ideal that the relationship (hereinafter also referred to as the x-y characteristic) between the output of the position detecting element 404 (that is to say, the position detection signal $P_{FB}$) or the corresponding position command value $P_{REF}$ (hereinafter denoted by a variable y) and the actual displacement of the lens 304 (the actuator 402) (hereinafter denoted by a variable x) is linear and invariant for temperature variation and has no variation. It is, however, realistic that the x-y characteristic is nonlinear, has a variation for each imaging device 300, and varies depending on the temperature of the position detecting element 404, Therefore, even when the position detection signal $P_{FB}$ and the position command value $P_{REF}$ match with each other, if this relationship (the x-y characteristic) changes, the actual position of the lens 304 also changes.

As described above, since the nonlinearity and the temperature change deteriorate the positioning accuracy, it is desirable to perform the linear compensation and the temperature compensation on the position detection signal $P_{FB}$. The linear compensation is realized by correcting a value of the position detection signal $P_{FB}$ so as to convert a function indicating the relationship between the position detection signal $P_{FB}$ and the actual displacement into an ideal linear function (straight line). The temperature compensation is realized by correcting, for each temperature, the slope and offset of the relationship between the position detection signal $P_{FB}$ varying depending on the temperature and the actual displacement.

The linear compensation will be first described in detail. In the case of linear compensation of AF, it is easy to obtain actual displacement information using a laser displacement gauge or the like. However, in the case of linear compensation of OIS, since the lens and the holder subject to the displacement measurement are placed within the housing of the actuator, it is difficult to measure the displacement with the laser displacement gauge. Therefore, in OIS, image information is used to measure the actual displacement. Only this point is different from the case of AF and the subsequent processing is the same. Thus, the linear compensation in OIS will be described here.

When the lens 304 is displaced in the X axis direction or the Y axis direction, since the permanent magnet 314 is also displaced in the X axis direction or the Y axis direction integrally with the lens 304, the Hall element 322 outputs a position detection signal. With this displacement, the image of an imaging target having a specific pattern also moves on the imaging element 302. That is to say, the imaging element 302 acts as an image displacement detecting element 408 to output a displacement detection signal $P_D$. The amount of image displacement detected here is obtained by multiplying information on the number of pixels, by which the specific pattern has moved in the image, by a pixel pitch. The amount of image displacement obtained thus is not the same as the actual amount of displacement of the lens 304. This is because optical magnification works between the lens displacement and the image displacement. However, the lens displacement and the image displacement basically have a proportional relationship, and the actual lens displacement is represented as the image displacement either when determining a nonlinear function or when determining an ideal linear function. Thus, a difference between the lens displacement and the image displacement has no effect. Only the position detection signal PFB detected by the Hall elements 320 and 322 is subjected to correction. The linear compensation is achieved by converting a nonlinear function into a linear function.

Next, the temperature compensation will be described. For this correction, the temperature detecting element 406 is provided. The temperature detecting element 406 detects the temperature of the position detecting element 404. When the temperature compensation of AF is performed, the temperature of the AF Hall element 320 is detected. When the temperature compensation of OIS is performed, the temperature of the OIS Hall element 322 is detected. The temperature detection can be performed by utilizing a change in the internal resistance of the Hall element by temperature. When the temperature of the position detecting element 404 and the ambient temperature are equal to each other or have a strong correlation, the temperature detecting element 406 may measure the ambient temperature. The detected temperature information T is input to the actuator driver IC 500. The actuator driver IC 500 corrects drive control of the actuator 402 based on the temperature information T. The temperature detecting element 406 may be a thermistor, a positive studio, a thermocouple or the like.

Hereinafter, a correcting process for performing control to suppress a temperature variation and an individual variation with a small memory capacity will be described by way of a first embodiment and a second embodiment. In the following description, the correcting process largely includes linear compensation for linearizing the position detection signal (position command value) and the actual displacement and temperature compensation for correcting the temperature variation.

<First Embodiment>

A first embodiment of the present disclosure will be described with reference to FIG. 8 to FIG. 14. FIG. 8 is a flowchart showing a process of linear compensation and temperature compensation in an imaging device according to the first embodiment. The overall process of linear compensation and temperature compensation will be described with reference to FIG. 8. In the first embodiment, the relationship between the position detection signal and the image displacement is functionalized as a curve and is then converted into a straight line.

Although steps S201 to S203 are described as being performed in an inspection process before shipment after manufacturing the imaging device 300, the present disclosure is not limited thereto. As will be described later, if this process is performed while a user is using a camera, a function at the temperature in use can be derived, eliminating a need for temperature compensation after linearization. Step S204 is set from experimental data at the development stage and the like. As described above, when the functionalization is performed while the user is using the camera, it is also unnecessary to set a coefficient for temperature compensation. In step S201, the relationship (x-y characteristic) between the position detection signal y (position detection value $P_{FB}$ in FIG. 7) and the displacement x is acquired at a predetermined temperature (also referred to as a reference temperature) $T_0$, for example, a set temperature of a manufacturing factory. In the present embodiment, the displacement x is a displacement of a specific pattern on the imaging element when the lens is displaced. The position detection signal y may be an output voltage of the Hall element. In the case of servo-on-measurement, the position detection signal y may be a target code (position command value $P_{REF}$ in FIG. 7), This is because the target code is a code indicating an access position of a target and becomes equivalent to the output voltage of the Hall element if a servo is applied to converge the access position to a target position. The relationship between the position detection signal y thus measured and the displacement x is not necessarily maintained at linearity and may be changed as the temperature changes from $T_0$. Step S201 is performed for all individuals.

Figure 9A:
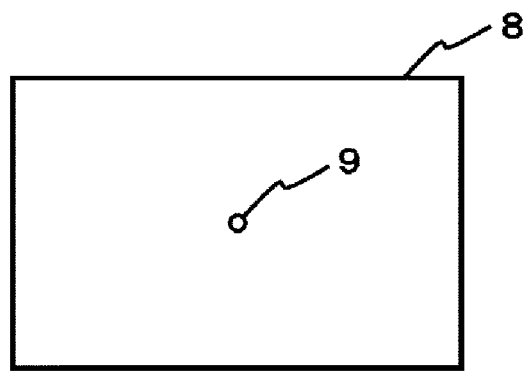
FIG. 9A and FIG. 9B are views for explaining a method of calculating an image displacement.
Figure 9B:
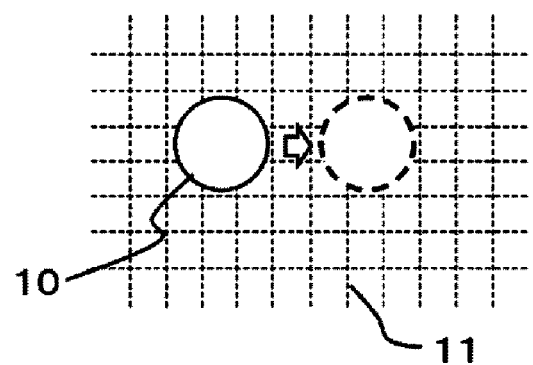

A method of measuring the image displacement will be described below. FIG. 9A and FIG. 9B are views for explaining a method of calculating an image displacement. FIG. 9A shows an example of an imaging target having a specific pattern and FIG. 9B shows a state in which an image of the specific pattern of the imaging target on the imaging element is shifted by movement of the lens. For measuring the image displacement, a dot pattern 9 as shown in FIG. 9A is used as the specific pattern of the imaging target (standard imaging target) 8. However, the dot pattern is not limited to that shown in FIG. 9A but may be white dots on a black background. In addition, a plurality of dots may be provided, or a pattern such as a cross line may be used instead of a dot. When such a dot pattern is used as an imaging target and the lens is shifted, the image 10 of the dot pattern moves on pixels as shown in FIG. 9B. A broken line in FIG. 9B indicates a pixel pitch 11. There is a possibility that the image 10 of the dot pattern may extend over a plurality of pixels. For example, when the number of pixels by which the center of the dot is shifted is detected, the image movement amount (image displacement) on the pixels can be calculated by multiplying the detected number of pixels by the pixel pitch. Instead of the center of the dot pattern, edge shift may be detected. By performing such measurement at a plurality of points within the movable range of the lens, it is possible to acquire the relationship between the position detection signal and the image displacement at the plurality of points.

Figure 10:
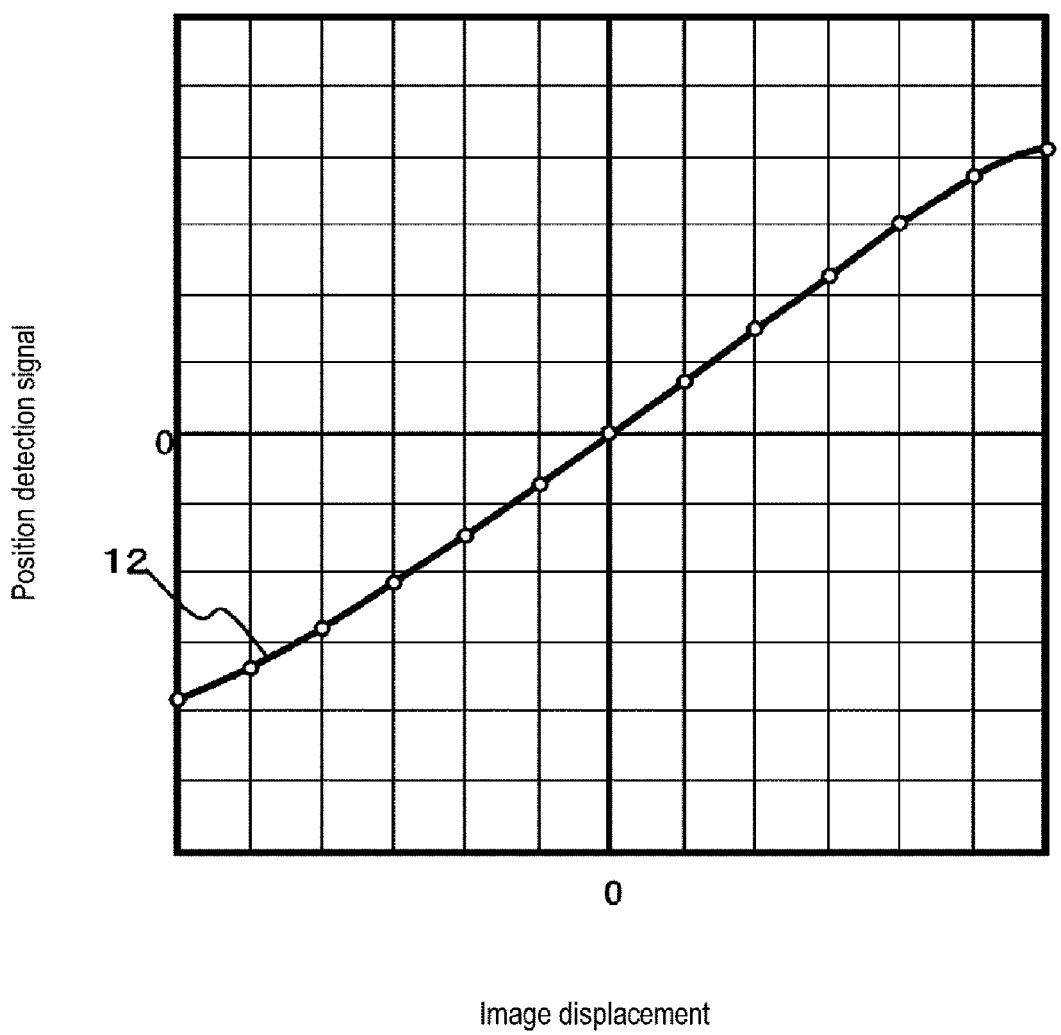
FIG. 10 is a graphical view showing an example of a relationship between a position detection signal and an image displacement.

FIG. 10 is a graphical view showing an example of the relationship between the position detection signal and the image displacement. A solid line 12 is a line obtained by connecting results of a plurality of measurement points with smooth curves. Since the OIS actuator usually has a movable range on both sides of the neutral state of a spring, the neutral state of the spring is set to the image displacement 0 of the graph. In addition, a position detection signal at this position is set to 0. As can be seen from FIG. 10, the linearity is relatively good in a region where the image displacement, that is to say, the shift amount of the lens, is small, but the linearity slightly deteriorates as the image displacement, that is to say, the shift amount of the lens, increases.

Figure 11:
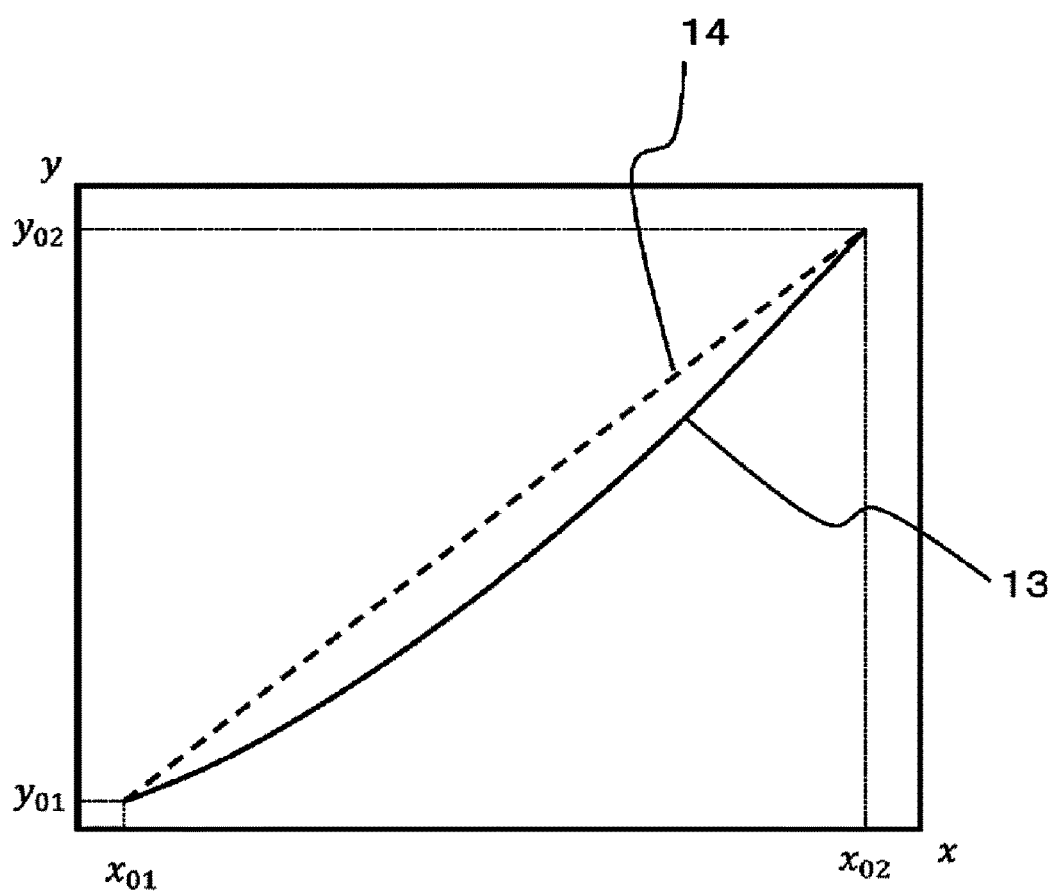
FIG. 11 is a graphical view showing a relationship between a functionalized curve and an ideal straight line.

In step S202, the relationship between the acquired position detection signal y and the image displacement x is functionalized. FIG. 11 is a graphical view showing a relationship between a functionalized curve and an ideal straight line. For example, when the relationship has a shape like a solid line 13 in FIG. 11, the relationship is usually functionalized in the form of y=f(x) but, in this embodiment, is functionalized as x=f(y) by taking an inverse function. Since the function fits a nonlinear relationship, a second or higher order function is needed, (polynomial approximation). Since increasing the order decreases a fitting error but increases the calculation amount, it is sufficient to set the order according to the actual situations. A fifth order function is used for the following linear compensation.

$$x=f(y)=k_0+k_1y+k_2y^2k_3y^3+k_4y^4+k_5y^5 \quad (1)$$

In the case of linear compensation in an actual imaging device, since it takes a long time to calculate this fifth order function and the memory capacity required during the calculation also increases, the function may be interpolated by linear connection, which will be described in the second embodiment.

In step S203, a linear function y=ax+b is set. A slope a and an intercept b of the linear function y=ax+b may be defined in consideration of the x-y characteristic obtained in step S201. For example, the slope a and the intercept b may be obtained by linearly approximating the x-y characteristic. The linear function y=ax+b may be determined irrespective of the x-y characteristic at the reference temperature $T_0$.

When zero point adjustment has been performed at the time of measurement, since a measurement result passes through the origin at the measurement stage, that is to say, b=0, it is only necessary to obtain the slope a. On the other hand, when the measurement result does not pass through the origin, the measurement result may be shifted so as to pass through the origin by performing offset correction (b≠0). Alternatively, as shown in FIG. 11, y=ax+b may be defined as a straight line 14 connecting two arbitrary points of the measurement result 13, for example, two points ($x_{01}$, $y_{01}$) and ($x_{02}$, $y_{02}$), at both ends of a practical stroke range.

In step S204, in order to compensate for the influence of a difference between the actual temperature $T_1$ and the predetermined temperature $T_0$, a slope correction coefficient c and an offset correction coefficient d are set. Although it is best to set these coefficients for different temperatures $T_1$ for different individual products in terms of compensation accuracy, it is not practical to measure the temperature characteristics for each product because of increased process costs. Therefore, it is desirable to set the optimal correction coefficients c and d by measuring the temperature characteristics of a plurality of representative samples in a laboratory or offline. A determination is made on how the correction coefficients change as the temperature changes with respect to the reference temperature. Since the x-y characteristic at the reference temperature is measured for each individual product, the optimal correction coefficients at each temperature are set assuming that there is a present change in the correction coefficients. The actual temperature $T_1$ may be discrete. If the actual temperature measured by a temperature measuring part to be described later is in the middle of a temperature range at which the correction coefficients are set in advance, the correction coefficients may be set by interpolation and calculation.

Steps S205 to S207 are performed during actual operation of the actuator driver IC 500. A value of the position detection signal y obtained from the position detecting element 404 during the actual operation is denoted by $y_1$.

In the step S205, a function f is used to obtain the displacement $x_1$ for the position detection signal $y_1$. The function f is a function set for the x-y characteristic at the predetermined temperature $T_0$, but the same function may be used at other temperatures. As described above, although the accuracy of correction can be enhanced when the function set at each temperature is used, in order to set the function for each temperature, it is necessary to measure temperature characteristic at each temperature for each sample, which is not practical. Therefore, the function at the predetermined temperature $T_0$ is used for all temperatures as in this example.

In step S206, the displacement $x_1$ obtained in this way is applied to the initially set linear function to calculate a linearly compensated detection code $y_2$.

Figure 12:
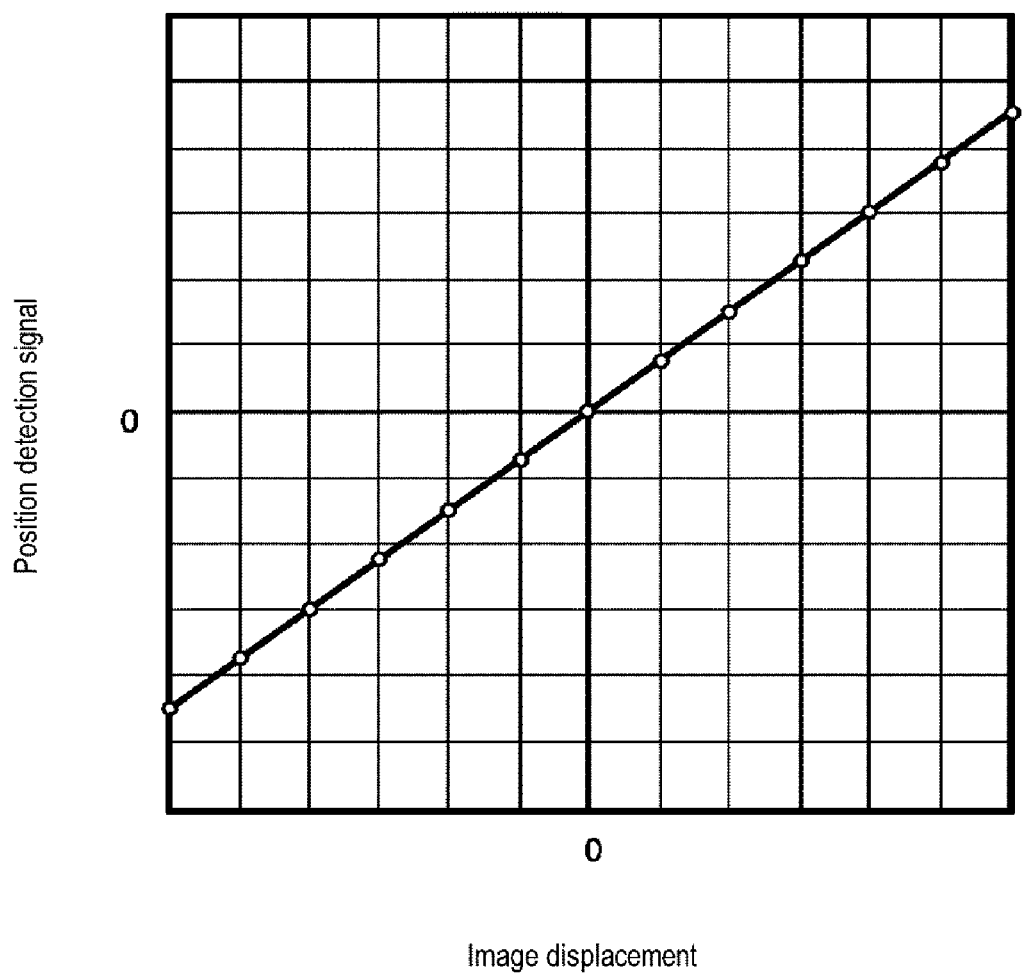
FIG. 12 is a graphical view showing a result after performing linear correction to the result of FIG. 10.
Figure 13:
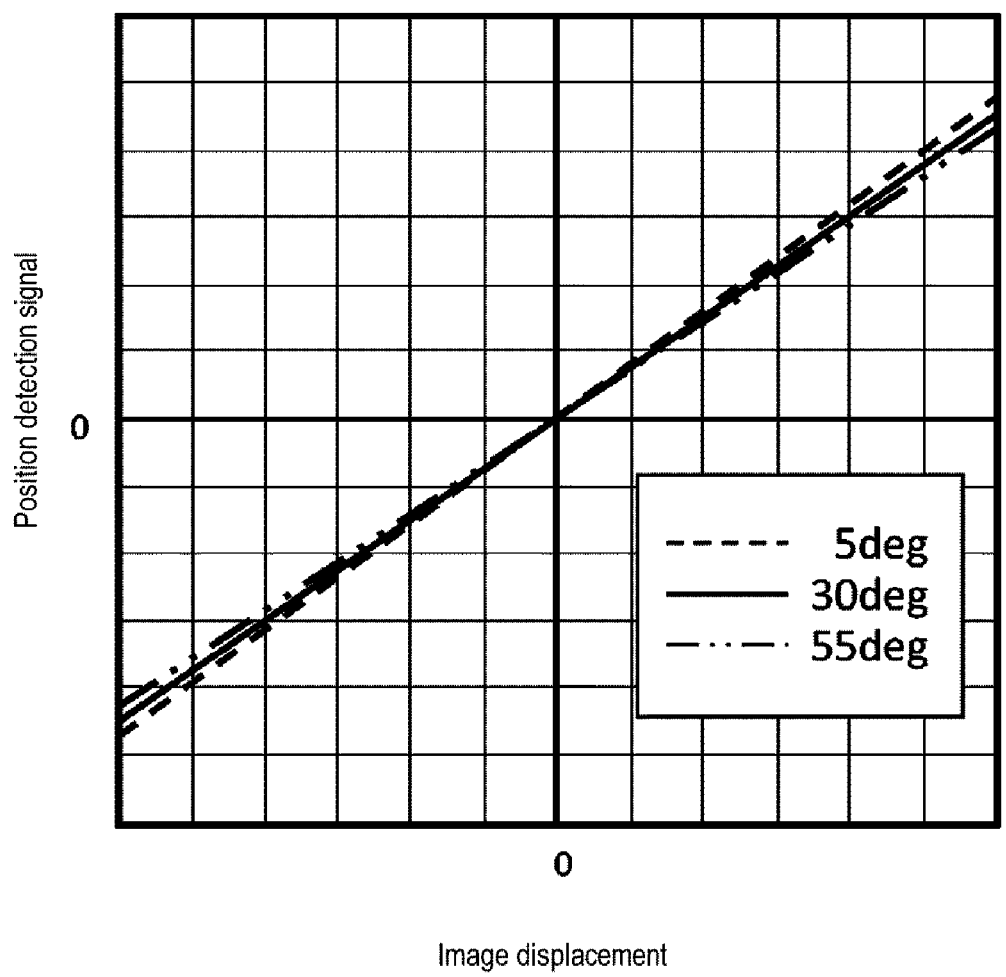
FIG. 13 is a graphical view showing a result indicating that the relationship between the position detection signal and the image displacement after performing the linear correction varies with temperature.

FIG. 12 is a graphical view showing a result after performing linear correction to the result of FIG. 10. However, this is a result when $T_1=T_0$. FIG. 13 is a graphical view showing a result indicating that the relationship between the position detection signal and the image displacement after performing the linear correction varies with temperature. Since the function is used with the predetermined temperature $T_0$ set to be 30 degrees C., a slight change in slope is observed at another temperature $T_1$.

In step S207, the slope correction and the offset correction are performed on the result at temperature $T_1$ different from $T_0$ so that the result at temperature $T_1$ becomes equal to the result at temperature $T_0$. That is to say, a detection code $y_3$ after temperature compensation is calculated for the detection code $y_2$ after linearization.

Figure 14:
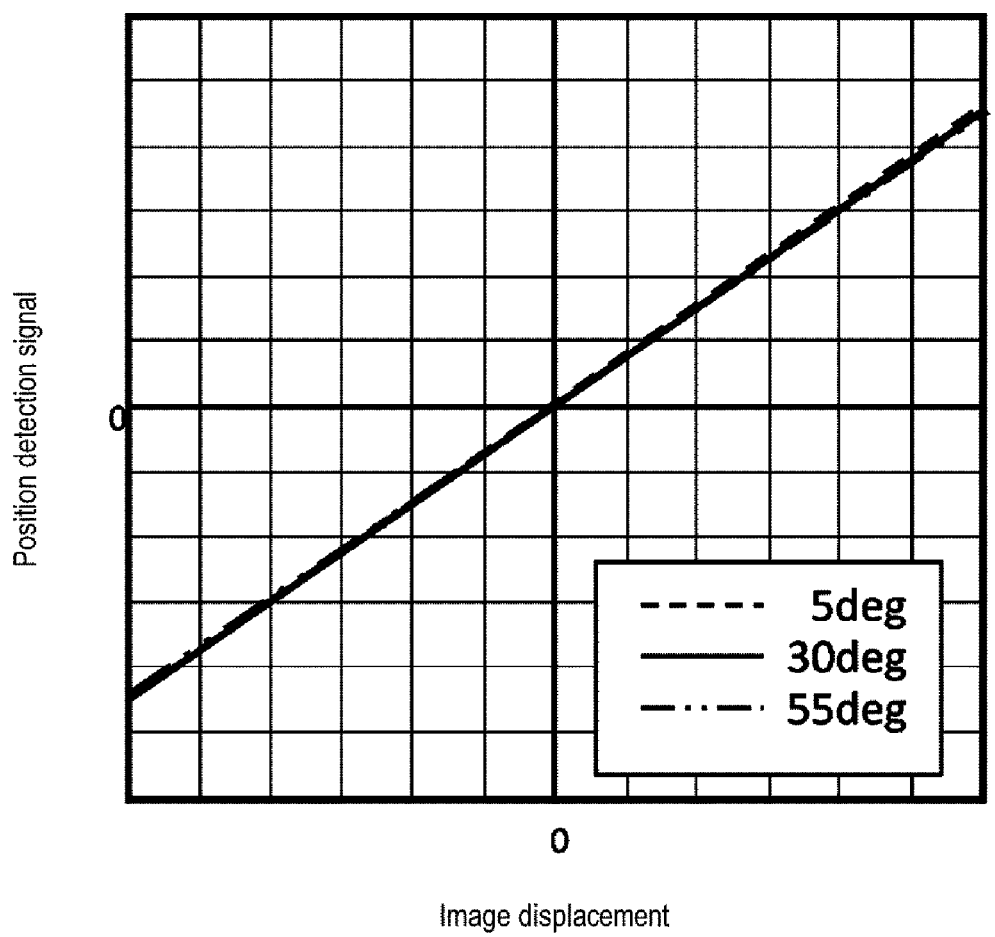
FIG. 14 is a graphical view showing a result after performing temperature compensation on the result of FIG. 13.

FIG. 14 is a graphical view showing a result after performing the temperature compensation on the result of FIG. 13. Results at different temperatures are also corrected to substantially the same straight line. Here, since the straight line in FIG. 13 passes nearly through the origin, no offset correction is performed and only the slope is corrected.

In this way, the linear compensation and the temperature compensation are performed to obtain substantially the linear x-y characteristic that is not affected by temperature, and the image displacement information is used to obtain the information on the actual lens displacement at the time of linear compensation. Thus, since it is unnecessary to use an expensive displacement measuring instrument or perform laborious measurement, it is possible to perform positioning with high accuracy.

The flowchart of FIG. 8 is just an example and does not specify all the processing orders. For example, the temperature compensation for the displacement component may be first performed and the linear compensation may be then performed on a result after the temperature compensation.

<Second Embodiment>

Figure 15:
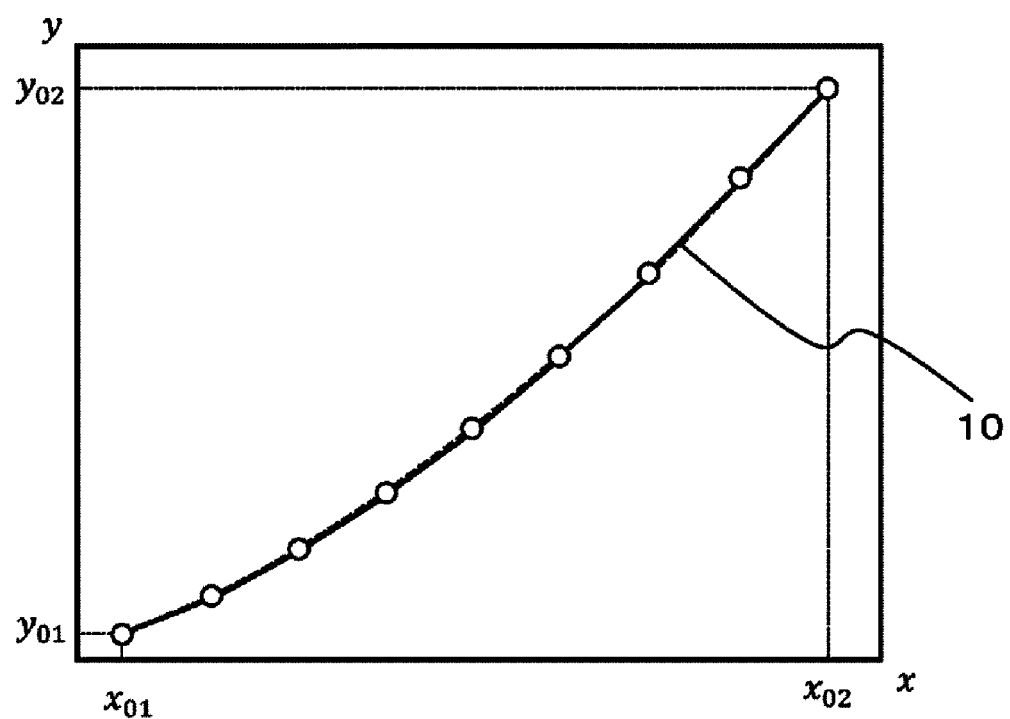
FIG. 15 is a graphical view for explaining a method for linearly approximating a function of an imaging device according to a second embodiment.

A second embodiment of the present disclosure will be described with reference to FIG. 15. FIG. 15 is a graphical view for explaining a method for linearly approximating a function in an imaging device according to the second embodiment.

In the first embodiment, when the relationship between the position detection signal y and the image displacement x at the predetermined temperature $T_0$ is a curve, a higher order function (in the first embodiment, the fifth order function) is used for the correcting process. That is to say, the function acquired in the inspection process or the like before factory shipment is stored in a memory. However, in the case of linear compensation in an actual imaging device, since it takes a long time to calculate this fifth order function and the memory capacity required during the calculation is large, the function may be interpolated by linear connection. Although there is a possibility that the calculation accuracy decreases slightly, an actuator with the x-y characteristic showing a smooth change is minimally affected by the linear interpolation. In a stroke range of AF and OIS of a typical camera module, linear interpolation connecting about 16 to 20 points is sufficient.

In FIG. 15, measurement points are indicated by a circle, a higher order function fit to data at these points is indicated by a broken line, and an approximate result obtained by connecting the points with a straight line is indicated by a solid line. If there are enough points, no significant difference between results obtained by the linear connection and by the higher order function occurs. Values of x and y at each measurement point may be saved in a memory as a correction table. In the step S205 of FIG. 8, when the position detection signal $y_1$ ween two measurement points is detected, the data of these two measurement points on both sides of the position detection signal $y_1$ may be used to obtain the value of $x_1$ as a first order function connecting these two points.

As is the case also in the first embodiment, although it has been described that the x-y characteristic in step S201 is acquired in the inspection process before factory shipment, the present disclosure is not limited thereto. After manufacturing a product such as a smartphone, for example, the correction function or the correction table may be updated by acquiring relationship data between x and y with a camera pointed to a specific imaging target (for example, a dot pattern as shown in FIG. 9A) at the time of activating the camera. Alternatively, for example, the correction function or the correction table may be updated in the same way when a user issues an update command (pushes an update button). Data in the inspection process before factory shipment may be saved in a ROM and written in a RAM, and may be updated as described above by updating the data in the RAM. When the camera has been turned off or not used for more than a certain period of time, the ROM data may be again written in the RAM.

By updating the relationship data between x and y in a use state of the camera as described above, linear compensation can be performed based on the relationship between x and y at ambient temperature. Thus, it is unnecessary to perform the temperature compensation, and the correcting process can be simplified. By using the method of the present disclosure, it is possible to obtain displacement information of the lens without using a dedicated measuring instrument. Therefore, it is possible to acquire the x-y relationship data even after a product such as a smartphone is manufactured, thereby facilitating real-time linear compensation. Of course, the temperature compensation becomes unnecessary.

<Temperature Detection>

Subsequently, a specific configuration example of the lens control device 400 will be described.

Figure 16:
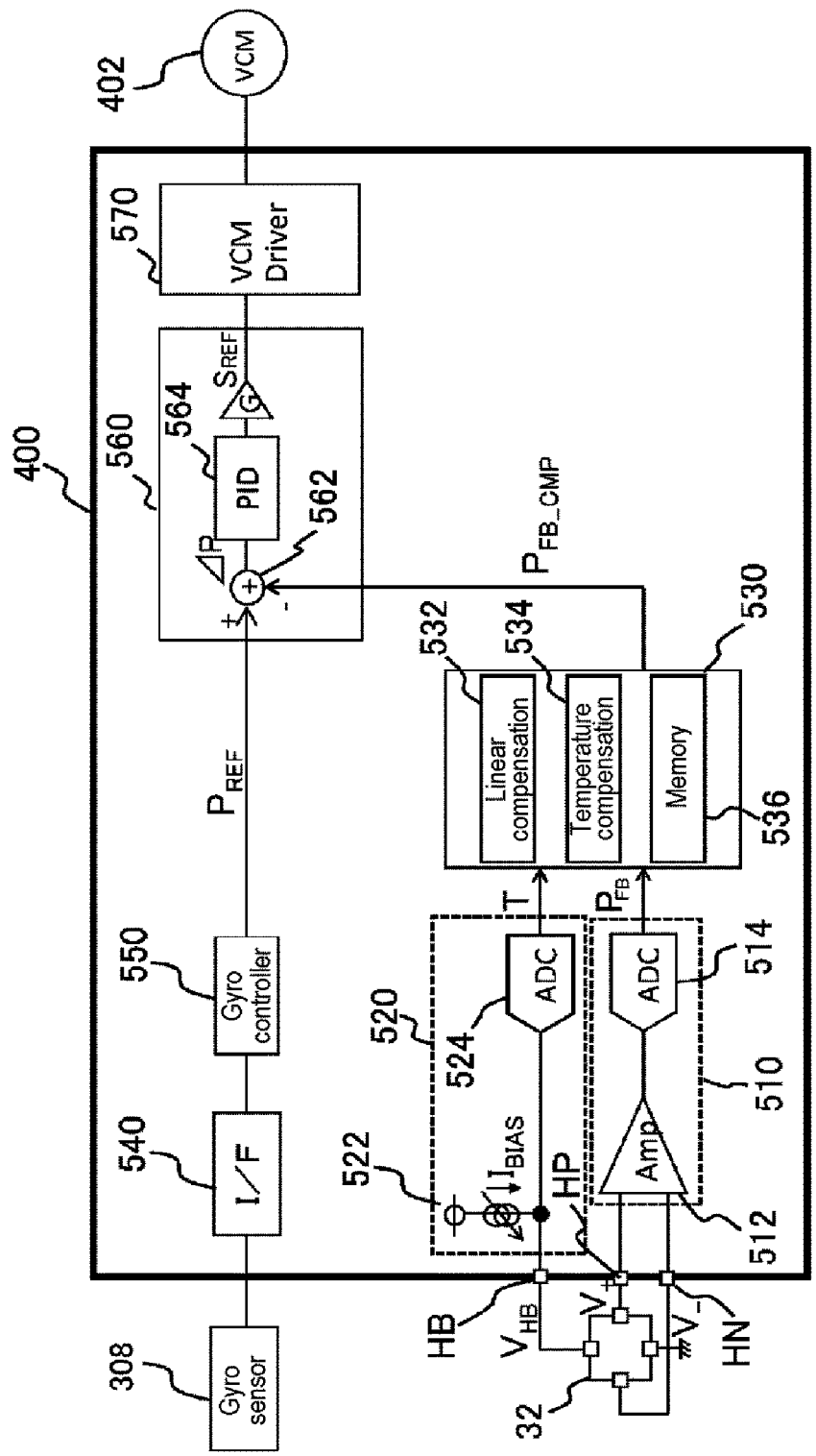
FIG. 16 is a specific block diagram of a lens control device.

FIG. 16 is a specific block diagram of the lens control device 400. The actuator driver IC is shown as an example of a configuration for one axis in OIS. The same configuration exists for other axes in OIS and for axes in AF. The position detecting element 404 is a Hall element 32 (318 or 320 in FIG. 7), and generates Hall voltages $V_+$ and $V_-$ according to the displacement of the movable part of the actuator 402 and supplies the generated Hall voltages $V_+$ and $V_-$ to Hall detection pins HP and FIN of the actuator driver IC 500.

A position detecting part 510 generates a digital position detection value $P_{FP}$ indicating the position (displacement) of the movable part of the actuator 402 based on the Hall voltages $V_+$ and $V_-$. The position detecting part 510 includes a Hall amplifier 512 that amplifies the Hall voltages $V_+$ and $V_-$ and an A/D converter 514 that converts the output of the Hall amplifier 512 into the digital position detection value $P_{FB}$.

A temperature detecting part 520 generates a temperature detection value T indicating the temperature. As described above, the temperature may be a temperature of the position detecting element 404. In FIG. 16, the Hall element 32 as the position detecting element 404 is also used as the temperature detecting element 406. This is based on the fact that the internal resistance r of the Hall element 32 has temperature dependence. The temperature detecting part 520 measures the internal resistance r of the Hall element 32, which is used as information indicating the temperature.

The temperature detecting part 520 includes a constant current circuit 522 and an A/D converter 524. The constant current circuit 522 supplies a predetermined bias current $I_{BIAS}$ to the Hall element 32. The bias current $I_{BIAS}$ is a power supply signal required to operate the Hall element 32. Therefore, the constant current circuit 522 may be grasped as a Hall bias circuit.

A voltage drop ($I_{BIAS} \times r$) occurs between both ends of the Hall element 32 and is input to a Hall bias pin (HB). The A/D converter 524 converts the voltage $V_{HB}$ ($=I_{BIAS} \times r$) of the HB pin into a digital value T. Since the bias current $I_{BIAS}$ is known and constant, the digital value T is proportional to the internal resistance r and therefore contains information on the temperature of the Hall element 32. The relationship between the internal resistance r and the temperature is measured in advance and is made into a function or a table. The digital value T is converted into temperature information in a correcting part 530 at a subsequent stage.

An interface circuit 540 receives a digital angular velocity signal from the gyro sensor 308. For example, the interface circuit 540 may be an SPI (Serial Peripheral Interface). A gyro controller 550 generates a position command value $P_{REF}$ based on the angular velocity signal received by the interface circuit 540.

The correcting part 530 corrects the position detection value $P_{FB}$ from the position detecting part 510. Specifically, the correcting part 530 includes a linear compensator 532, a temperature compensator 534, and a memory 536. The linear compensator 532 corrects the linearity of the relationship between the position detection value $P_{FB}$ and the actual displacement (the above-mentioned x-y characteristic). The above-mentioned parameters a and b, data (for example, coefficients $k_0$ to $k_5$) describing the function x=f(y), parameters c and d, and the like are stored in the memory 536. The memory 536 may be a nonvolatile memory such as a ROM or a flash memory, or may be a volatile memory temporarily holding data supplied from an external ROM each time the circuit is activated.

The temperature compensator 534 corrects a change in the relationship between the position detection value $P_{FB}$ and the actual displacement due to temperature change.

A controller 560 receives a position command value PREF and a position detection value $P_{FB\_CMP}$ after the correction by the correcting part 530. The controller 560 generates a control command value $S_{REF}$ so that the position detection value $P_{FB\_CMP}$ becomes equal to the position command value $P_{REF}$. When the actuator 402 is a voice coil motor, the control command value $S_{REF}$ is a command value of a drive current to be supplied to the voice coil motor. The controller 560 includes, for example, an error detector 562 and a PID controller 564. The error detector 562 generates a difference (error) $\Delta P$ between the position detection value $P_{FB\_CMP}$ and the position command value $P_{REF}$. The PID controller 564 generates the control command value $S_{REF}$ by PID (Proportional-Integral-Derivative) calculation. Instead of the PID controller 564, a PI controller may be used or nonlinear control may be adopted.

A driver part 570 supplies a drive current corresponding to the control command value $S_{REF}$ to the actuator 402.

As can be seen from FIG. 16, the Hall voltages $V_+$ and $V_-$ from the Hall element 32 are output from a terminal different from an application terminal of a control current.

The processes by the correcting part 530 and the controller 560 may be realized by hardware such as an adder and a multiplier, or may be realized by a combination of a CPU and a software program.

Such a lens control device may be installed to correspond to the control of each of the X, Y and Z axes, or may be integrated into one chip or two chips if necessary.

The lens control device as described above is used for a camera module for mobile phones and the like. In particular, one suitable application of the lens control device of the present disclosure is an imaging device having an OIS (Optical Image Stabilizer) function. By using embodiments of the present disclosure, it is possible to perform linear compensation without using an expensive measuring instrument. Further, it is possible to position the lens at a high speed and with high accuracy by using the linear compensation together with temperature compensation. Therefore, the present disclosure can be suitably applied to an imaging device having an OIS function.

According to the present disclosure in some embodiments, it is possible to acquire data required for linear compensation without using a laser displacement gauge or a laser Doppler measuring instrument.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An imaging device comprising:
an imaging element;
a lens disposed on a path of incident light to the imaging element;
an actuator configured to displace the lens in a plane perpendicular to an optical axis;
a hall sensor configured to generate a position detection signal indicating a displacement of the lens; and
an actuator driver configured to feedback-control the actuator based on the position detection signal and a target code indicating a target displacement of the lens, the actuator driver including:
a hall detection pin from which the position detection signal is supplied;
a position detector that generates a first detection code corresponding to the position detection signal;
a hall bias pin connected to the hall sensor;
a temperature detector that converts a voltage, which is generated by supplying a bias current to the hall sensor via the hall bias pin, of the hall bias pin into a temperature detection signal;
a correction circuit that converts the first detection code into a second detection code having a linear relationship with an actual displacement of the lens by correcting a linearity of a relationship between the first detection code and the actual displacement of the lens and correcting a change in the relationship due to a temperature change, based on the first detection code and the temperature detection signal; and
a control circuit that controls the actuator so that the second detection code approaches the target code,
wherein, in a calibrating process of acquiring a relational expression for converting the first detection code into the second detection code, the actual displacement of the lens is based on a moving distance of an image captured by the imaging element.

2. The imaging device of claim 1, wherein the moving distance of the image is calculated from the number of pixels, by which the image moves, and a pixel pitch of the imaging element.

3. The imaging device of claim 1, wherein the relational expression for converting the first detection code into the second detection code is linearly approximated in each of a plurality of sections.

4. The imaging device of claim 1, wherein the relational expression for converting the first detection code into the second detection code has temperature dependency.

5. A method of calibrating an imaging device including: an imaging element; a lens disposed on a path of incident light to the imaging element; an actuator configured to displace the lens in a plane perpendicular to an optical axis; a hall sensor configured to generate a position detection signal indicating a displacement of the lens; and an actuator driver configured to feedback-control the actuator based on the position detection signal and a target code indicating a target displacement of the lens, the actuator driver including: a hall detection pin from which the position detection signal is supplied; a position detector that generates a first detection code corresponding to the position detection signal; a hall bias pin connected to the hall sensor; a temperature detector that converts a voltage, which is generated by supplying a bias current, to the hall sensor via the hall bias pin, of the hall bias pin into a temperature detection signal; a correction circuit that converts the first detection code into a second detection code having a linear relationship with an actual displacement of the lens by correcting a linearity of a relationship between the first detection code and the actual displacement of the lens and correcting a change in the relationship due to a temperature change, based on the first detection code and the temperature detection signal; and a control circuit that controls the actuator so that the second detection code approaches the target code, the method comprising:
presenting an imaging target as a reference to the imaging device;
acquiring, while the actuator driver controls the actuator to displace the lens to a plurality of points, the first detection code and a moving distance of an image captured by the imaging element at each of the plurality of points; and
generating a relational expression for converting the first detection code into the second detection code based on the first detection code and the moving distance of the image obtained at each point of the plurality of points.

6. The method of claim 5, further comprising:
converting the moving distance of the image obtained at each point of the plurality of points into the actual displacement of the lens,
wherein the relational expression for converting the first detection code into the second detection code is generated based on the first detection code and the actual displacement of the lens obtained at each point of the plurality of points.

7. An actuator driver for use in an imaging device including: an imaging element; a lens disposed on a path of incident light to the imaging element; an actuator configured to displace the lens in a plane perpendicular to an optical axis; a hall sensor configured to generate a position detection signal indicating a displacement of the lens; and the actuator driver configured to feedback-control the actuator based on a target code indicating a target displacement of the lens and the position detection signal, the actuator driver comprising:
a hall detection pin from which the position detection signal is supplied;
a position detector that generates a first detection code corresponding to the position detection signal;
a hall bias pin connected to the hall sensor;
a temperature detector that converts a voltage, which is generated by supplying a bias current to the hall sensor via the hall bias pin, of the hall bias pin into a temperature detection signal;

a correction circuit configured to convert the first detection code into a second detection code having a linear relationship with an actual displacement of the lens by correcting a linearity of a relationship between the first detection code and the actual displacement of the lens and correcting a change in the relationship due to a temperature change. based on the first detection code and the temperature detection signal;

a control circuit configured to control the actuator so that the second detection code approaches the target code; and a processor configured to execute a calibration program to acquire a relational expression for converting the first detection code into the second detection code, wherein the actual displacement of the lens acquired during the execution of the calibration program is based on a moving distance of an image captured by the imaging element.

8. The actuator driver of claim 7, wherein the calibration program provides a function of automatically generating, inside the actuator driver, the target code for moving the lens to a plurality of points.

9. The actuator driver of claim 7, wherein the calibration program provides a function of automatically generating, inside the actuator driver, the relational expression for converting the first detection code into the second detection code.

10. The actuator driver of claim 7, wherein the actuator driver is integrated on a single substrate.

* * * * *